United States Patent [19]

Morris et al.

[11] Patent Number: 4,800,097
[45] Date of Patent: Jan. 24, 1989

[54] DRIED NUTMEAT AND STARCH FOOD PRODUCT AND PROCESS

[75] Inventors: Charles Morris, Brooklyn Park; George Bateson, Roseville, both of Minn.

[73] Assignee: Ogilvie Mills, Inc., Minnetonka, Minn.

[21] Appl. No.: 881,487

[22] Filed: Jul. 1, 1986

Related U.S. Application Data

[63] Continuation of Ser. No. 678,923, Dec. 5, 1984, abandoned.

[51] Int. Cl.⁴ .............................................. A23L 1/36
[52] U.S. Cl. .................................... 426/632; 426/443; 426/661
[58] Field of Search ............... 426/632, 633, 601, 621, 426/102, 661, 443, 446, 447, 448

[56] References Cited

U.S. PATENT DOCUMENTS

| | | | |
|---|---|---|---|
| 3,317,325 | 5/1967 | Durst | 426/633 |
| 3,723,131 | 3/1973 | Bixby et al. | 426/633 |
| 3,940,505 | 2/1976 | Nappen et al. | 426/661 |
| 4,232,052 | 11/1980 | Nappen et al. | 426/633 |
| 4,418,088 | 11/1983 | Cantenot | 426/549 |

OTHER PUBLICATIONS

Mottern et al, Food Technology, 23(4)169, 1969.

*Primary Examiner*—Donald E. Czaja
*Assistant Examiner*—Carolyn Paden
*Attorney, Agent, or Firm*—Fisher, Christen & Sabol

[57] ABSTRACT

This invention relates to a dried nutmeat and starch food product which can optionally contain other food additives such as honey and cheese. This food product is prepared by a method which comprises: (a) Emulsifying starch, nutmeat and water mixture to form a homogeneous emulsion wherein the starch is partially gelatinized, and the nutmeat is comminuted; and then (b) drying the emulsion of (a).

19 Claims, No Drawings

DRIED NUTMEAT AND STARCH FOOD PRODUCT AND PROCESS

This application is a continuation of application Ser. No. 678,923, filed Dec. 5, 1984, now abandoned.

BACKGROUND OF THE INVENTION

A great variety of dried food products are prepared with starch. Advantageously, dried food stuffs can be stored for extended periods of time without deterioration. Food stuffs can thus be dried for purposes of preservation; or for purposes of convenience, as with food stuffs which are intermediates needed for the preparation of other commercially distributed foods.

Known methods for preparing dried food products include U.S. Pat. No. 3,940,505 to National Starch and Chemical Corporation which describes a process for the drum drying of such diverse fruits and vegetables as: Beets, peppers, carrots, tomatos, lemons, limes, blueberries, strawberries, cranberries, apples, onions, pineapples, bananas, meats, cheeses, garlic and shallots. In accordance with the process described in this patent, dried food stuffs can be prepared by blending the food material in a comminuted form with starch and then drum drying. This process calls for the addition of water, if necessary.

Problems are encountered however, if the above described drum drying method is used with food materials having a high fat content. In fact, U.S. Pat. No. 4,232,052, also to National Starch and Chemical Corporation, specifically sights the above indicated patent (U.S. Pat. No. 3,940,505) and discusses the problems encountered with food stuffs having a high fat content. In accordance with this teaching, when the drum drying procedure is used with foods having a high fat content such as almonds and peanuts, a pasty consistency develops rather than the desired powdered state. Accordingly, U.S. Pat. No. 4,232,052 avoided such difficulties encountered with the earlier process by first forming a solution of a film forming starch, dextrin, or gum, and then spray drying this solution in the presence of latent gas to form a grinding agent. This grinding agent is then added in a dry form to the high fat food stuff in an amount of from 25 to 400% by weight of the fat content in order to achieve powdering.

U.S. Pat. No. 4,232,052 indicates previous methods used to prepare dry, powdered high fat food products include: making a paste or emulsion of the food followed by spray drying with an inert carrier. One disadvantage, however, of the spray drying technique mentioned above is that frequently fat and other components separate when a high fat food product is spray dried.

It has now been discovered that drum or extrusion dried food stuffs can be prepared from nutmeats; which are a food material having high fat content. Furthermore, this can be achieved without encountering the aforementioned pasting problems and without using the previously indicated dried grinding agents. Drum or extrusion drying can also be used while simultaneously maintaining the homogeneous consistancy of the food product. Accordingly, it is an object of the instant invention to provide for a drum or extrusion dried nutmeat and starch food product. It is a further object of the instant invention to provide a method for the drum or extrusion drying of a homogeneous food product made from high fat content nutmeats. Other objects will become apparent as this description proceeds.

SUMMARY OF THE INVENTION

A dried nutmeat and starch food product can be prepared by a process comprising: (a) Emulsifying a starch, nutmeat, and water mixture to form a homogeneous emulsion wherein the starch is at least partially gelatinized, and the nutmeat is comminuted, and then (b) drying the emulsion of (a). When the homogeneous emulsion of (a) is extrusion or drum dried the starch is further gelatinized to produce the dried nutmeat and starch food product.

Here the above described method produces a dried homogeneous food product from the blended, emulsified nut and starch mixture which can be ground to a powder. During emulsification, the starch is at least partially gelatinized before drying. During drying, the gelatinization of the starch will proceed even further. Preferably extrusion drying is used, so that gelatinization is substantially complete for the amount of water available during the drying step.

DETAILED DESCRIPTION

To form the food product of the instant invention, nutmeat and starch are mixed in water to form an emulsion. The proper consistancy is obtained when the starch is at least partially gelatinized. It is preferred to use high shear in mixing sufficient amounts of water, nutmeats and starch. Such high shear mixing serves to develop a well homogenized starch and nutmeat emulsion; and will also comminute the nut meat. Furthermore, the heat generated by the high shear mixing will help gelatinize the starch.

The nutmeat can be chopped, ground or whole when added for emulsification as long as the agitation used in mixing is sufficient to comminute the nutmeat during emulsification.

The starch, water, or nutmeat can be added in any convenient manner or sequence. The starch and water can acceptably be premixed. In such a case if gelatinization of the starch occurs before emulsification with the nutmeat, the proper homogeneous emulsion with comminuted nutmeat could be more difficult to achieve. When this occurs, greater agitation for a sufficient length of time will produce the proper homogeneous emulsion. Additionally, it is preferred to comminute the nutmeat before emulsification.

A sufficient amount of water is used in the mixture with starch and nutmeat. An acceptable minimum amount is about 10% by weight of the total wet mixture. The maximum amount of water permitted will tend to depend on individual circumstances. In either extrusion or drum drying there are limits of practicality which are determined by the individual systems used, and on the particular settings that are applied in each individual system. Temperature, for example, is one setting which can be varied that will tend to control the maximum amount of water permitted for the mixture being dried. Thus, the maximum amount of water for the wet mixture tends to be controlled by practicality. An acceptable maximum of water, however, is about 45% by weight of the total aqueous mixture. Acceptably therefore the broad range of the amount of water used can be from about 10 to about 45% by weight of the total aqueous mixture. Preferably, the water is used in an amount of from about 15 to about 35% by weight of the total aqueous mixture.

It can be noted that water can be used in a minimum amount at or near 10% by weight of the total wet mixture which is emulsified. In such a case, drying is still necessary, even though the amount of water eliminated during drying could be slight. If, for example, the amount of water used was about 10% by weight of the total mixture added for emulsification, the emulsified mixture could be dried to an acceptable water content of about 10% by weight water. In such a case, drum or extrusion drying would serve to eliminate a minimum amount of water, and also and most importantly would add necessary heat needed to cause further gelatinization of the starch. In this case, the drying step would use most of the water to further gelatinize the starch thus making the water unavailable for acid hydrolysis. Advantageously this can tend to prolong the life of the finished product.

Acceptably, after emulsification, the wet mixture should be dried to less than 10% by weight water; preferably the amount of water should be less than about 6% by weight of water.

Emulsification is necessary to obtain a non separable, homogeneous mixture of proper consistency. While water is needed to achieve this, too much water would make this state difficult, if not impossible, to achieve. Using large amounts of water, therefore, tends to be impractical. Preferably, water should thus be used in an amount necessary to achieve emulsification. When this is done, the amount of water is also practical for the drum or extrusion drying which follows.

The starch content of the aqueous emulsion can acceptably be from about 8 to about 65% by weight (wt.). Preferably, the starch should be present in an amount of from about 10 to about 50% by weight and most preferably the starch is present in an amount of from about 11 to about 40% by wt. The nutmeats can be added in an amount of from about 5 to about 77% by wt. of the aqueous mixture. It is, however, preferred to maintain the nuts in a higher concentration. Therefore, a more preferred concentration for the nutmeat is from about 20 to about 77% by wt., and most preferably in an amount of from about 35 to about 77% by wt.

The drying technique used in the process of the instant invention can be either drum drying or extrusion drying. Both of these techniques are known and widely used in the food industry. Both drum drying and extrusion drying are applied to the homogeneous emulsion in a manner which will encourage further gelatinization of the starch. Both drum and extrusion drying, and any particular drum drying or extrusion drying technique or system are suitable.

Drum drying is used by applying a thin film of the emulsion to the outer surface of a rotating heated drum. The emulsion to be dried can be applied by means of applicator rolls or by dipping the drum into a pan containing the emulsion. The drum rotational speed and temperature is selected so that sufficient drying will occur before one complete revolution. After the material has dried sufficiently it is removed from the drum before another revolution begins. The drum rotational speed and the temperature selected will, to a great extent depend upon the amount of water in the particular emulsion to be dried. Acceptably the drum rotational speed can be from about 0.5 to about 20 revolutions per minute (rpm). Preferred speeds can be selected from the range of from about 0.8 to about 12 rpm. Acceptably the drum temperature can range from about 90° to 275° C. and preferably from about 100° to about 220° C.

Single or double drum driers can be used. One acceptable drum dryer which can be used is a double drum dryer which consists of two single drums operated in parallel usually with a common feed system. When a double drum dryer is used, the feed is retained and partially concentrated in the reservoir formed by the nip between the drums. The clearance between the drums can be adjusted to control the film thickness. Liquid is conveyed through the clearance, dried, and the product is removed from the back sides of the drums preferably by doctor knives.

Heated extrusion is another method for drying the emulsion formed in step (a) of this invention. Advantageously when extrusion drying is used in accordance with the instant invention the starch in the emulsion being dried is further gelatinized, and to a higher degree than a comparable drum drying method could achieve. Thus extrusion drying is a preferred drying method. Heated extrusion drying is done by continuously feeding the emulsion into an inlet of an extruder fitted with a heated barrel and continuously collecting the dried material as it exits the extruder. The extruder can be a single or multiple screw extruder fitted with a barrel that can heated to maintain the selected barrel temperature. The temperature selected in any one application will depend on the particular circumstances, ends and needs of that application. The temperature selected for any one extruder should be sufficient to reduce the water content in the finished product to a maximum of less than 10% by wt. of the total product. Acceptably, a temperature in the range of from about 70° to about 275° C. is sufficient. A preferred temperature range is from about 85° to about 250° C.

The heated barrel of an extrusion dryer heats the contents of the extruder to volatilize water contained in the emulsion; the product produced by such volatilization of water in an extrusion dryer is said to be "extrusion dried". The extruder barrel can be vented to allow the escape of the water vapor. The extruder outlet can also be fitted with a dye face cutter to cut the extrudate into the desired lengths. The precise operating procedures of the extruder will depend on variable promoters such as the desired rate of output, and the desired degree of dryness of the dried product. Advantageously the extruder can be selected or designed to dry the product into specific shapes.

Any nutmeat is suitable for use in the instant invention. Representative, but non exhaustive examples of acceptable nutmeats are peanut, almond, walnut, cashew, pistachio, brazil nut, macadamia and pecan. Acceptably, nutmeat can be present in the dried food product from about 10 to about 85% by wt. of the nutmeat. It is however preferred to keep the nutmeat concentration at a maximum. Therefore, a preferred amount of nutmeat in the finished food product is from about 50 to about 85% by wt.

Representative but non exhaustive examples of starches which can be used with the instant invention include starch and starch products derived from corn, rice, tapioca, maize, wheat, sago, and potato. An acceptable minimum amount of starch in the finished product of the instant application is about 15% by wt. Broadly, the amount of starch can be as high as about 90% by weight of the total dried product. A preferred range for the amount of starch, however, is from about 15 to about 50% by wt. of the total dried product since it is desired to keep the nutmeats at a maximum concentration.

The instant process can be advantageously used to convert nutmeats into a dried food product. As a preferred embodiment, after drying the food product can be ground into a powdered form. When an extrusion drying technique is used, it is acceptable and even preferred for certain uses to leave the dried product in its extruded dried shape.

Advantageously, the product of the instant invention even with high nutmeat content will have an extended life as compared to nutmeats which have not been emulsified and homogenized, and then dried with at least partially gelatinized starch to remove water and further gelatinize the starch. Thus the instant invention prolongs the life of the nutmeat contained therein, and discourages its rancidity.

A preferred embodiment of the instant invention calls for food additives such as honey and cheese for flavoring purposes. Using the technique of the instant invention, honey can be added in a sufficient amount before or during emulsification. A preferred honey concentration is from about 10 to about 50% by weight of the total dried product. Preferably honey is present in an amount of from about 10 to about 35% by weight in the wet mixture to be emulsified.

If a cheese flavoring is desired to compliment the nutmeat, a sufficient amount of cheese or cheese flavoring can be added to the starch, nutmeat and water mixture before or during emulsification. Acceptably, cheese can be added up to 50% by wt. of the wet mixture. Preferably cheese or cheese flavoring in the dried product is present in an amount of from about 10 to about 40% by weight.

Either fresh or processed fruit such as a puree or a dried fruit can also be added in a sufficient amount to the wet mixture before or during the emulsification step (a) thereby providing another optional flavoring. A preferred amount of fruit in the dried product is from about 10 to about 40% by weight of the total dried product. Fresh or processed fruit can be added to the wet mixture before or during emulsification in a preferred amount of from about 10 to about 30% by weight of the total wet mixture.

These and other readily attainable variations in the process of the instant invention will be more fully understood from the example which follows. This example is intended to clarify and demonstrate the instant invention and not to limit it. All parts and percentages are by weight unless otherwise specified.

EXAMPLES

Example 1

The following ingredients were combined according to the following wt. %:
31.6% peanut meal
17.0% wheat starch
51.4% water The peanut meal was analyzed to be 45.6% fat and 2.7% by wt. moisture. All of these ingredients were added to a blender and mixed at high speed until a smooth, thick emulsion slurry is formed. This emulsion was sufficiently thick and cohesive so that a sample of it could be placed in a mound on a flat surface. The homogeneous emulsion formed by blending the above indicated materials was added to a six inch double drum dryer set for the dryer conditions indicated below.

| DRYER CONDITIONS: | | | |
|---|---|---|---|
| Drum Steam Pressure | NIP Gap | Drum RPM | Pond Depth |
| 72 psi | .02 inch | 5 | ½" to 1 inch |

A dry grindable sheet was formed from drying the emulsion on the dryer at the above indicated settings. The dried grindable product was then analyzed and the moisture content was measured to be 2.8% by wt. The fat content was analyzed to be 26.0% by weight (wt.).

Example II

Raw peanuts were roasted for 17 minutes in an electric oven at 400° F. Then the following ingredients were combined according to the following amounts:
45.4% roasted peanuts
19.5% wheat starch
35.0% water The peanuts before roasting were analyzed to have 46.7% by wt. fat and 4.6% by wt. After roasting, the peanuts were analyzed to have a 49.8% fat content and a 1.8% by wt. moisture. All of these ingredients were added to a blender and mixed at high speed until a smooth, thick emulsion slurry is formed. This emulsion was sufficiently thick and cohesive so that a sample of it could be placed in a mound on a flat surface. The homogeneous emulsion formed by blending the above indicated material was added to a six inch double drum dryer set for the dryer conditions indicated below.

| Drum Steam Pressure | NIP Gap | Drum RPM | Pond Depth |
|---|---|---|---|
| 72 psi | .02 inch | 1 | ½ to 1 inch |

A dry grindable sheet was formed from drying the emulsion on the dryer at the above indicated settings. The dried grindable product was then analyzed and the moisture content was measured to be 0.8% by wt. The fat content was analyzed to be 30.2% by weight (wt.).

Example III

The following ingredients were combined according to the following wt. %:
44.3% peanut meal
14.8% wheat starch
41.0% water The peanut meal was analyzed to be 45.6% fat and 2.7% by wt. moisture. All of these ingredients were added to a blender and mixed at high speed until a smooth, thick emulsion slurry is formed. This emulsion was sufficiently thick and cohesive so that a sample of it could be placed in a mound on a flat surface. The homogeneous emulsion formed by blending the above indicated materials was added to a six inch double drum dryer set for the dryer conditions indicated below.

| DRYER CONDITIONS | | | |
|---|---|---|---|
| Drum Steam Pressure | NIP Gap | Drum RPM | Pond Depth |
| 60 psi | .02 inch | 5 | ½ to 1 inch |

A dry grindable sheet was formed from drying the emulsion on the dryer at the above indicated settings. The dried grindable product was then analyzed and the moisture content was measured to be 1.4 by wt. The fat content was analyzed to be 47.3% by weight (wt.).

Example IV

The following ingredients were combined according to the following wt. %:
 45.5% raw blanched peanuts
 19.4% wheat starch
 35.0% water The raw, blanched peanuts were analyzed to have a fat content of 41.4% fat. All of the above ingredients were added to a blender and mixed at high speed until a smooth, thick emulsion slurry is formed. This emulsion was sufficiently thick and cohesive so that a sample of it could be placed in a mound on a flat surface. The homogeneous emulsion formed by blending the above indicated materials was added to a six inch double drum dryer set for the dryer conditions indicated below.

| DRYING CONDITIONS: | | | |
|---|---|---|---|
| Drum Steam Pressure | NIP Gap | Drum RPM | Pond Depth |
| 60 psi | .02 inch | 6 | ½ to 1 inch |

A dry grindable sheet was formed from drying the emulsion on the dryer at the above indicated settings. The dried grindable product was then analyzed and the moisture content was measured to be 2.9% by wt. The fat content was analyzed to be 35.1% by wt.

Example V

The following ingredients were combined according to the following wt. %:
 29.1% peanut meal
 33.3% dark bakers honey
 20.8% wheat starch
 16.6% water The peanut meal was analyzed to be 45.6% fat. All of these ingredients were added to a blender and mixed at high speed until a smooth, thick emulsion slury is formed. This emulsion was sufficiently thick and cohesive so that a sample of it could be placed in a mound on a flat surface. The homogeneous emulsion formed by blending the above indicated materials was added to a six inch double drum dryer set for the dryer conditions indicated below.

| DRYER CONDITIONS | | | |
|---|---|---|---|
| Drum Steam Pressure | NIP Gap | Drum RPM | Pond Depth |
| 75 psi | .02 inch | .86 | ½ to 1 inch |

A dry grindable sheet was formed from drying the emulsion on the dryer at the above indicated settings. The fat content was then analyzed to be 18.2% and the moisture content at 3.1%.

What is claimed is:

1. A process for preparing a dried nutmeat and starch containing food product comprising:
   (a) emulsifying a starch, nutmeat, and water mixture, wherein the mixture comprises from about 8 to about 65% of starch, to form a homogeneous emulsion wherein the starch is at least partially gelatinized starch and the nutmeat is comminuted, and then
   (b) drying the emulsion produced in step (a) by drum drying or extrusion drying, to form a dried nutmeat and starch containing food product.

2. A process as described in claim 1 wherein the emulsion is extrusion dried.

3. A process as described in claim 1 wherein the emulsion is drum dried.

4. A process as described in claim 3 wherein the starch in step (a) is present in an amount of from about 8 to 65% by weight.

5. A process as described in claim 3 wherein the nutmeat in step (a) is present in an amount of from about 5 to about 77% by weight.

6. A process as described in step 3 wherein the water in the mixture of step (a) is present in an amount of from about 10 to about 45% by weight.

7. A process as described in claim 3 wherein honey is also added to the mixture.

8. A process as described in claim 7 wherein the honey is added to the mixture of step (a) in an amount of from about 10 to about 35% by weight.

9. A process as described in claim 2 wherein the nutmeat is present in the mixture of step (a) in an amount of from about 20 to about 77% by weight and the starch is present in an amount of from about 10 to 50% by weight.

10. A process as described in claim 2 wherein cheese is added to the mixture of step (a) in an amount up to 50% by weight of the mixture.

11. A process as described in claim 3 wherein the mixture of step (a) is drum dried in step (b) in a temperature in the range of from about 100° to about 220° C., and at a drum speed of from about 0.5 to about 20 revolutions per minute.

12. A process as described in claim 2 wherein the mixture of step (a) is extrusion dried at a temperature of from about 70° to about 275° C.

13. A food product prepared by the process of claim 1.

14. A food product as described in claim 13 wherein:
   (a) the starch is present in an amount of from about 15to about 50% by weight,
   (b) the nutmeat is present in an amount of from about 85 to about 50%, and
   (c) the water is present in an amount less than 6% by weight.

15. A food product as described in claim 14 further comprising a member selected from the group consisting of: honey, cheese and cheese flavoring.

16. A food product as described in claim 13 wherein honey is present in an amount of from about 10 to about 35%.

17. A food product as described in claim 13 wherein cheese is present in an amount of from about 10 to about 40% by weight.

18. A food product as described in claim 14 wherein the homogeneous emulsion also contains fruit.

19. A food product as described in claim 16 wherein the fruit is present in the dried product in an amount of from about 10 to about 40% by weight.

* * * * *